United States Patent
Mihara

(10) Patent No.: US 10,059,327 B2
(45) Date of Patent: Aug. 28, 2018

(54) ENERGY HARVESTING SYSTEM FOR VEHICLE

(71) Applicant: EMPIRE TECHNOLOGY DEVELOPMENT LLC, Wilmington, DE (US)

(72) Inventor: Masaaki Mihara, Chiba (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 49 days.

(21) Appl. No.: 15/106,291

(22) PCT Filed: Dec. 31, 2013

(86) PCT No.: PCT/US2013/078393
§ 371 (c)(1),
(2) Date: Jun. 18, 2016

(87) PCT Pub. No.: WO2015/102593
PCT Pub. Date: Jul. 9, 2015

(65) Prior Publication Data
US 2017/0036667 A1 Feb. 9, 2017

(51) Int. Cl.
*B60W 20/15* (2016.01)
*B60K 6/38* (2007.10)
(Continued)

(52) U.S. Cl.
CPC .............. *B60W 20/15* (2016.01); *B60K 6/38* (2013.01); *B60K 6/48* (2013.01); *B60L 11/02* (2013.01);
(Continued)

(58) Field of Classification Search
CPC ..... B60W 20/15; B60W 20/13; B60W 10/023
See application file for complete search history.

(56) References Cited

U.S. PATENT DOCUMENTS

| 5,103,127 A * | 4/1992 | Peter | ........................ B60K 6/40 |
| | | | 123/179.1 |
| 6,184,603 B1 * | 2/2001 | Hamai | ..................... B60K 6/26 |
| | | | 180/65.22 |

(Continued)

FOREIGN PATENT DOCUMENTS

| JP | H08322108 A | 12/1996 |
| JP | 2002250436 A | 9/2002 |
| JP | 2003063264 A | 3/2003 |

OTHER PUBLICATIONS

International Search Report and Written Opinion of the International Searching Authority, International application No. PCT/US2013/078393, dated Sep. 29, 2014.

(Continued)

*Primary Examiner* — Sean Gugger
(74) *Attorney, Agent, or Firm* — Turk IP Law, LLC

(57) ABSTRACT

Briefly stated, technologies are generally described for harvesting energy for a vehicle having an engine and a torque converter. In various examples, an energy harvesting system is described, where the torque converter may be configured to have an input shaft driven by the engine, and an output shaft. Each of the input shaft and output shaft of the torque converter may be mechanically coupled to one of a first portion and a second portion of an electric generator. The electric generator may generate electrical energy using a rotational speed difference between the input shaft and the output shaft of the torque converter. As a result, the electric generator may store at least a portion of the electrical energy, which otherwise would be lost at the torque converter, in a charge storage device. The stored electrical energy may be transmitted to an assist motor configured to drive a rotation of wheels.

26 Claims, 9 Drawing Sheets

(51) Int. Cl.
    *B60W 10/02*     (2006.01)
    *B60W 10/06*     (2006.01)
    *B60W 10/08*     (2006.01)
    *F16H 41/24*     (2006.01)
    *B60W 20/13*     (2016.01)
    *B60L 11/02*     (2006.01)
    *B60K 6/48*     (2007.10)

(52) U.S. Cl.
    CPC .......... *B60W 10/023* (2013.01); *B60W 10/06* (2013.01); *B60W 10/08* (2013.01); *B60W 20/13* (2016.01); *F16H 41/24* (2013.01); *B60K 2006/4825* (2013.01); *B60Y 2400/426* (2013.01); *B60Y 2400/427* (2013.01); *F16D 2500/10493* (2013.01); *Y02T 10/6252* (2013.01); *Y02T 10/6286* (2013.01); *Y10S 903/93* (2013.01)

(56) References Cited

U.S. PATENT DOCUMENTS

| | | | |
|---|---|---|---|
| 6,217,476 B1 * | 4/2001 | Muller | B60K 6/26 192/25 |
| 6,340,339 B1 * | 1/2002 | Tabata | B60K 6/26 180/65.26 |
| 6,781,272 B2 | 8/2004 | Kahlon et al. | |
| 7,509,802 B2 * | 3/2009 | Hammond | B60K 6/26 60/330 |
| 7,810,592 B2 | 10/2010 | Klemen et al. | |
| 7,891,450 B2 | 2/2011 | Soliman et al. | |
| 9,321,342 B2 * | 4/2016 | Liu | B60K 6/365 |
| 2004/0129465 A1 * | 7/2004 | Yamaguchi | B60K 6/26 180/65.24 |
| 2008/0060859 A1 * | 3/2008 | Klemen | B60K 6/40 180/65.25 |
| 2009/0071784 A1 * | 3/2009 | Combs | B60K 6/40 192/3.21 |
| 2013/0023379 A1 | 1/2013 | Bucknor et al. | |

OTHER PUBLICATIONS

Larry Greenemeier, "The Dark Horse in the Race to Power Hybrid Cars", Scientific American, Aug. 28, 2007.

"Torque Converter", Wikipedia, Retrieved from the Internet on Nov. 26, 2013 at < URL: https://en.wikipedia.org/wiki/Torque_converter>, last modified on Aug. 7, 2012.

* cited by examiner

ENERGY HARVESTING SYSTEM FOR VEHICLE

ROSS-REFERENCE TO RELATED APPLICATION

The present application is a U.S. National Stage filing under 35 § 371 of International Application No. PCT/US2013/078393, tiled on Dec. 31, 2013 and entitled "ENERGY HARVESTING SYSTEM FOR VEHICLE." The International Application No. PCT/ US2013/078393, including any appendices or attachments thereof, is hereby incorporated by reference in its entirety.

BACKGROUND

Unless otherwise indicated herein, the approaches described in this section are not prior art to the claims in this application and are not admitted to be prior art by inclusion in this section.

Existing hybrid vehicles have a complicated structure combining a conventional internal combustion engine and one or more electric motors. Also, such hybrid vehicles typically use a secondary battery such as a lithium ion battery, which results in significantly increasing their weight and manufacturing costs compared to the conventional vehicles having internal combustion engine.

For example, a series hybrid vehicle includes an engine tuned for running an electric generator for generating electrical energy, and a battery such as a lithium ion battery for storing the electricity from the electric generator and providing the stored electricity to an electric motor for driving wheels. In such a system, the motor torque is sufficiently large for driving the wheels at a low speed, while the efficiency may decrease significantly when the motor is operated to drive the wheels at a high speed. Contrary to the series hybrid vehicle, a parallel hybrid vehicle has been designed to install an electric motor and an internal combustion engine such that they can drive the wheels individually or in cooperation. Also, a series-parallel hybrid vehicle has been developed where one or more electric motors and an internal combustion engine are installed to share the power for driving the wheels. In such a vehicle, however, the installation of more than one electric motor requires a more sophisticated controller and results in cost increase.

As described above, the conventional hybrid vehicles require a complicated controller for controlling one or more motors to drive the wheels with sufficient torque. Also, a high-capacity battery, such as a lithium ion battery, used in powering the electric motors attributes to a significant increase in the manufacturing cost.

SUMMARY

Technologies are generally described for energy harvesting for a vehicle.

Various example energy harvesting systems for a vehicle having an engine and a drive shaft described herein may include a torque converter, an electric generator, a charge storage device, and an assist motor. The torque converter may be configured to have an input shaft mechanically coupled to the engine, and an output shaft mechanically coupled to the drive shaft. The electric generator may be configured to have a first portion and a second portion. The first portion may be mechanically coupled to the input shaft of the torque converter, and the second portion may be mechanically coupled to the output shaft of the torque converter. The electric generator may be operable to generate electrical energy when the first portion of the electric generator rotates relative to the second portion of the electric generator. The charge storage device may be electrically coupled to the electric generator and operable to store at least a portion of the electrical energy as stored electrical energy. The assist motor may be mechanically coupled to the drive shaft and operable to receive electrical energy generated by the electric generator.

In some examples, methods for harvesting energy for a vehicle are described. The vehicle may be configured to have a torque converter and an engine, the torque converter having an input shaft driven by the engine, the torque converter further having an output shaft. Example methods may include generating electrical energy using a rotational speed difference between the input shaft and the output shaft of the torque converter. The electrical energy may be converted into a mechanical torque, and the mechanical torque may be applied to the drive shaft. For example, applying a mechanical torque may include supplying electrical energy to an assist motor that is mechanically coupled to the drive shaft.

In some examples, a computer-readable storage medium is described that may be adapted to store a program for controlling a processor operable to harvest energy for a vehicle, which may be configured to have an engine, a torque converter, and a drive shaft, the torque converter having an input shaft and an output shaft. The processor may include various features as further described herein. The program may include one or more instructions for generating electrical energy from a rotational speed difference between the input shaft and the output shaft. The program may further include one or more instructions for storing at least part of the electrical energy in a charge storage device, and transferring the electrical energy to an assist motor mechanically coupled to the drive shaft, thereby applying a mechanical torque to the drive shaft.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
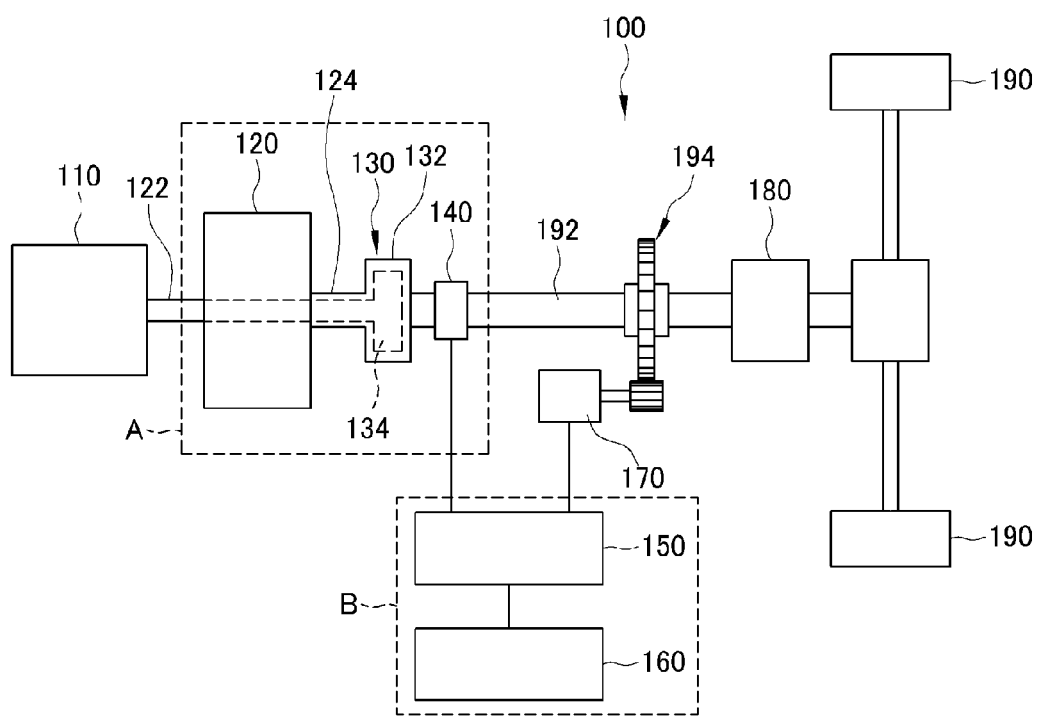
FIG. 1 schematically shows a block diagram of an illustrative example vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to harvesting energy for a vehicle.

Briefly stated, technologies are generally described for harvesting energy for a vehicle having an engine and a torque converter. In various examples, an energy harvesting system is described, where the torque converter may be configured to have an input shaft driven by the engine, and an output shaft. Each of the input shaft and output shaft of the torque converter may be mechanically coupled to one of a first potion and a second portion of an electric generator. The electric generator may generate electrical energy using a rotational speed difference between the input shaft and the output shaft of the torque converter. As a result, the electric generator may store at least a portion of the electrical energy, which otherwise would be lost at the torque converter, in a charge storage device. The stored electrical energy may be transmitted to an assist motor configured to drive a rotation of wheels.

In some embodiments, the first portion of the electric generator may be a rotor and the second portion of the electric generator may be a stator. Alternatively, the first portion of the electric generator may be a stator and the second portion of the electric generator may be a rotor.

In some embodiments, the torque converter may include a fluid coupler. In this case, the first portion of the electric generator may be configured to rotate relative to the second portion of the electric generator when there is slippage in the fluid coupler.

In some embodiments, the engine may be an internal combustion engine. Alternatively, the engine may be one of a gasoline engine, a diesel engine, a gas turbine engine, a rotary engine, a Wankel rotary engine, a barrel engine, a gasoline-electric hybrid engine, and a diesel-electric hybrid engine.

In some embodiments, the system may further include an assist motor controller operable to control a rate of transfer of the electrical energy from electric generator or from the charge storage device to the assist motor. The assist motor controller may be operable to control the rate of transfer of the electrical energy based on various parameters including at least one of a voltage across the charge storage device, an electrical charge stored on the charge storage device, a rotational speed of the drive shaft, an engine speed, an engine torque, a wheel speed, and accelerator input. For example, the assist motor controller may be configured to receive an accelerator signal based on a vehicle accelerator input and a charge storage signal based on a stored charge in the charge storage device. Electrical energy applied to the assist motor may be based on these and optionally other signals, for example the electrical energy may be increased when there is an appreciable vehicle accelerator input.

FIG. 1 schematically shows a block diagram of an illustrative example vehicle, arranged in accordance with at least some embodiments described herein. As depicted, a vehicle 100 may include an engine 110, a torque converter 120 having an input shaft 122 and an output shaft 124, an electric generator 130 having a first portion 132 and a second portion 134, a slip ring 140, a charge storage device 150, an assist motor controller 160, an assist motor 170, a transmission 180, wheels 190, a drive shaft 192, and a one-way clutch 194.

Input shaft 122 of torque converter 120 may be mechanically coupled to engine 110, and output shaft 124 may be mechanically coupled to drive shaft 192. The first portion 134 of electric generator 130 may be mechanically coupled to input shaft 122 of torque converter 120, and the second portion 132 of electric generator 130 may be mechanically coupled to output shaft 124 of torque converter 120. Electric generator 130 may be operable to generate electrical energy when the first portion 134 rotates relative to the second portion 132. In some embodiment, electric generator 130 may be an AC (alternating current) generator, a DC (direct current) generator, or a combination thereof.

In some embodiments, the first portion 134 of electric generator 130 may be configured as a rotor while the second portion 132 of electric generator 130 may be configured as a stator. Alternatively, the first portion 134 of electric generator 130 may be configured as a stator while the second portion 132 of electric generator 130 may be configured as a rotor.

In some examples, torque converter 120 may include a fluid coupler. In this example, the first portion 134 of electric generator 130 may be configured to rotate relative to second portion 132 of electric generator 130 when there is slippage in the fluid coupler, which will be described in detail later.

As illustrated, vehicle 100 may further include a charge storage device 150 electrically coupled to electric generator 130 and operable to store the electrical energy from electric generator 130. In some embodiments, charge storage device 150 may be coupled to electric generator 130 through a slip ring (or a commutator) 140, such that charge storage device 150 is configured to receive the electrical energy from electric generator 130 through slip ring 140. Additionally, charge storage device 150 may be electrically coupled to electric generator 130 through a rectifier (not shown).

In some embodiments, charge storage device 150 may be configured to provide the stored electrical energy to an assist motor 170, which may be controlled by an assist motor controller 160. Assist motor controller 160 may be operable to control a rate of transfer of the electrical energy from electric generator 130 or from charge storage device 150 to assist motor 170. More specifically, assist motor controller 160 may be operable to control the rate of transfer of the electrical energy based on various parameters including at least one of a voltage across charge storage device 150, an electrical charge stored on charge storage device 150, a rotational speed of drive shaft 192, a speed and/or a torque of engine 110, a speed of wheels 190, and an accelerator input, which will be described in detail later. The drive shaft may be coupled to the wheels through a differential and axles.

In some embodiments, assist motor 170 may be coupled to drive shaft 192 through a one-way clutch 194. Also, drive shaft 192 may be coupled to drive wheels 190 via a transmission 180. In this manner, output shaft 124 of torque converter 120 can be coupled to drive shaft 192 via transmission 180.

In the above embodiments, engine 110 may be an internal combustion engine. Alternatively, engine 110 may be any other suitable engine operable by vehicle 100, including a gasoline engine, a diesel engine, a gas turbine engine, a rotary engine, a Wankel rotary engine, a barrel engine, a gasoline-electric hybrid engine, or a diesel-electric hybrid engine. Further, vehicle 100 may be any type of vehicle, including but not limited to an automobile, a truck, train, other wheeled vehicle, boat, and the like. In some examples, a drive shaft may be used to drive one or more wheels, such as a pair of wheels, or other vehicle propulsion mechanism such as tracks, propeller, and the like.

Some example embodiments may use a capacitor as the charge storage device, which may be lower in cost than a secondary battery. However, in some examples, the charge storage device may include one or more of the following: a capacitor (such as a supercapacitor or ultracapacitor), a pseudocapacitor, a secondary battery, or combinations thereof. In various examples, the electrical energy produced by the electric generator may be used to charge a car battery, such as a rechargeable lead acid battery or a lithium-ion battery, or other electrochemical charge storage device. In some examples, a charge storage device may include one or more capacitors and/or one or more batteries and is not necessarily a unitary device but may include various components, and may include electrical components such as overvoltage protection, voltage regulation, current limiting, charge rate control, and the like.

Figure 2:
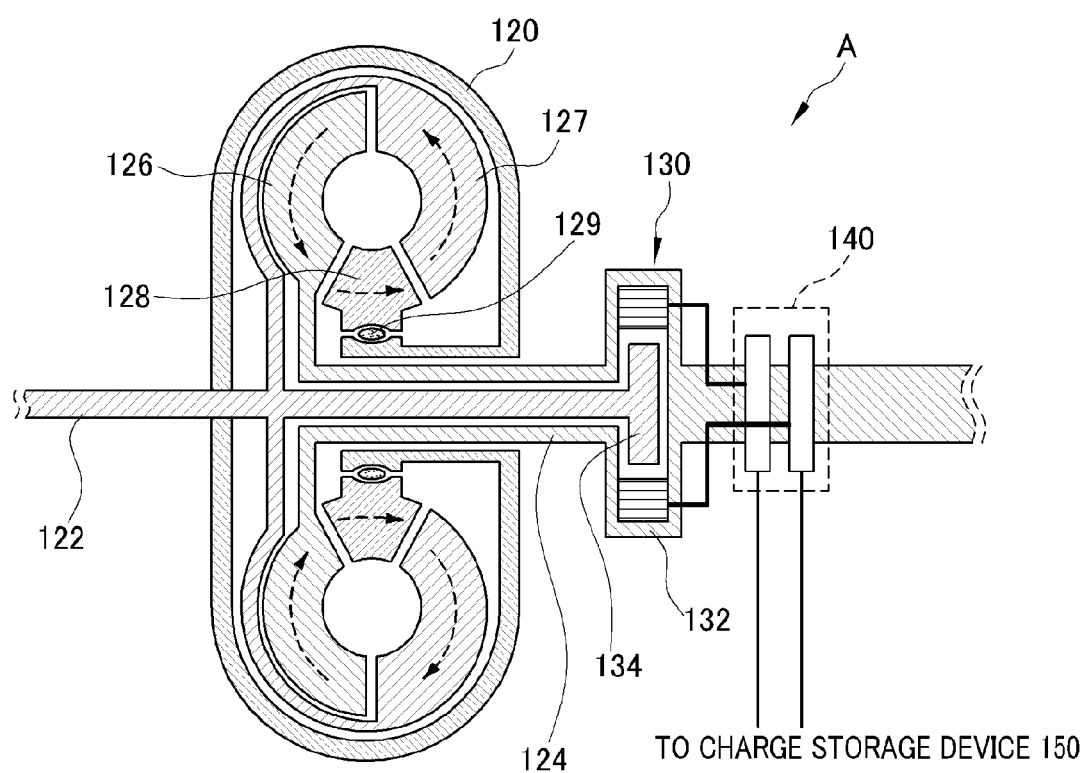
FIG. 2 schematically shows a cross-sectional view of an illustrative example torque converter coupled to an electric generator.

FIG. 2 schematically shows a cross-sectional view of an illustrative example torque converter coupled to an electric generator, arranged in accordance with at least some embodiments described herein. More specifically, FIG. 2 illustrates a section A in vehicle 100 of FIG. 1. FIG. 2 shows the input shaft 122, output shaft 124, torque converter 120 including turbine 126, pump 127, stator 128, and one-way clutch 129, electric generator 130 having first portion 132 and second portion 134, and slip ring 140.

Torque converter 120 may be a large doughnut shaped device (e.g., with a diameter in a range from about 10 to 15 inches) that may be mounted between engine 110 and electric generator 130.

As depicted, torque converter 120 may include a turbine 126, a pump 127, a stator 128, and a one-way clutch 129. These elements 126 to 129 may be configured to cooperatively transmit power from engine 110 to drive shaft 192. Pump 127 may be arranged inside the housing of torque converter 120, where one end of concentric axis of pump 127 may be mechanically coupled to input shaft 122 of torque converter 120, such that pump 127 is configured to turn at a pump speed that is approximately proportional to a speed of engine 110. Further, the other end of concentric axis of pump 127 may be mechanically coupled to first portion (in this example, a rotor) 134 of electric generator 130. Turbine 126 may also be arranged inside the housing of torque converter 120 to be opposite to pump 127, such that turbine 126 may be mechanically coupled to second portion (in this example, a stator) 132 of electric generator 130. Further, the transmission stator 128 can be mounted between inner sides of pump 127 and turbine 126. Stator 128 may be coupled to the housing of torque converter 120 through one-way clutch 129 so that the stator can spin freely in one direction but not in the other direction. Each of turbine 126, pump 127, and stator 128 may include fins mounted therein and configured to precisely direct the flow of transmission fluid (e.g., oil) through torque converter 120.

With the above configuration of torque converter 120, when engine 110 drives the rotation of input shaft 122 of torque converter 120, the transmission fluid may flow into pump 127 and be pushed outward by centrifugal force until the transmission fluid reaches turbine 126 so that turbine 126 begins to turn. The fluid may continue to circulate towards the center of turbine 126 to enter stator 128. If turbine 126 turns significantly slower than pump 127, the fluid will make contact with the fins on a front side of stator 128, which in turn urges stator 128 to move into one-way clutch 129 and thus prevent stator 129 from turning. When stator 128 stops, the fins of stator 128 direct the fluid to re-enter pump 127 at a certain angle which may cause a torque increase. As the turning speed of turbine 126 becomes substantially equal to that of pump 127, the fluid reaches blades on a back side of stator 128, which urges stator 128 to turn in the same direction as pump 127 and turbine 126. Further, as the engine speed increases, turbine 126, pump 128 and stator 128 all begin to turn at substantially the same speed.

In some embodiments, electric generator 130 may be configured to generate electrical energy when the first portion 134 coupled to pump 127 rotates relative to the second portion 132 coupled to turbine 126. As described above, because torque converter 120 has a fluid coupling configuration including turbine 126, pump 127, and stator 128, the first portion 134 of electric generator 130 may rotate relative to second portion 132 of electric generator 130 when there is slippage in the fluid coupling configuration. The electrical energy generated from electric generator 130 may be transmitted to charge storage device 150 through slip ring 140. FIG. 2 more clearly shows the electrical couplings between the electric generator 130 and the slip ring 140.

A torque converter may be a device used to transfer power from the engine to the driveshaft (and wheels), and may include a fluid or other coupling susceptible to slippage when the input shaft and output shaft of the torque converter are rotating at different angular speeds. Some examples may use a lock-up torque converter, in which electrical power may not be generated when lock-up occurs, due to similar speeds of the input and output shafts at the torque converter. In some examples, the torque converter may be a part of an automatic transmission assembly or associated with a transaxle, with additional gearing provided by the transmission. In some examples, the coupling may be through intermediate members, gears, and the like. The ratio of the engine speed and the drive shaft rotational speeds may vary based on a number of criteria such as a gear ratio, and there not necessarily a one-to-one correspondence between engine speed and drive shaft speed. In some examples, slippage in the torque converter may result in the drive shaft rotational speed being lower than an expected rotational speed. An expected rotational speed of the drive shaft may be determined from the engine speed and mechanical factors such as gear ratios. For example, vehicle energy (e.g. mechanical energy) lost when the output shaft rotational speed differs from the expected rotational speed (for example, when the output shaft rotational speed is less than expected due to slippage in the torque converter during acceleration), may be recovered, in substantial whole or in part, as electrical energy. Similarly, vehicle energy lost during deceleration may be recovered, in substantial whole or in part, as electrical energy. An example electric generator may have a first portion and a second portion, where the first portion is mechanically coupled to the input shaft of the torque converter, and the second portion is mechanically coupled to the output shaft of the torque converter. The electric generator may be operable to generate electrical energy when the first portion of the electric generator rotates relative to the second portion of the electric generator. In some examples, the electric generator assembly may be associated with, or include, a gear assembly configured so that the first portion of the electric generator only rotates relative to the second portion of the electric generator when there is slippage in the fluid coupling. For example, the gear assembly may compensate for any gearing in the drive train located between where the first portion of the electric generator is coupled to the input shaft and where the second portion of the electric generator is coupled to the output shaft. In some examples, there may be a non-unitary speed ratio between the turning speed of turbine and that of the pump, and the gear assembly associated with or included in the electric generator may compensate for this speed ratio.

Figure 3:
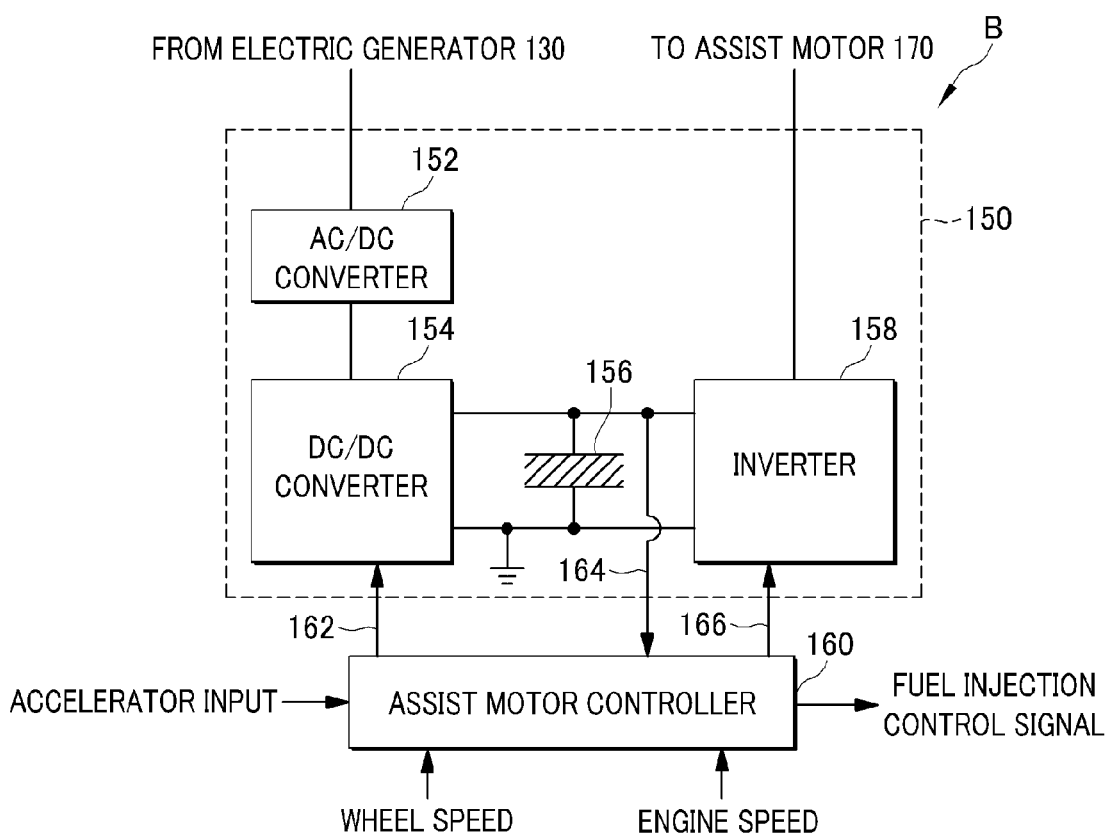
FIG. 3 schematically shows a block diagram of an illustrative example charge storage device coupled to a motor controller.

FIG. 3 schematically shows a block diagram of an illustrative example charge storage device coupled to an assist motor controller, arranged in accordance with at least some embodiments described herein. As depicted, charge storage device 150 may include an AC/DC converter 152, a DC/DC converter 154, a capacitor 156, an inverter 158, and an assist motor controller 160. The assist motor controller is configured to provide control signals 162 and 166, and also configured to receive sense signal 164.

In some examples, electric generator 130 may be an AC generator, where the AC/DC converter 152 may be configured to receive the electrical energy in the form of an AC signal from electric generator 130 through slip ring 140, and also configured to convert the AC signal into a DC signal. In some examples, electric generator 130 may be or include a DC generator, and the AC/DC converter 152 may be omitted in charge storage device 150 if not required to convert an AC signal to a DC signal.

In some embodiments, the DC/DC converter 154 may be configured to receive the DC signal from AC/DC converter 152 (or from electric generator 130 in case of DC generator), and adjust an output DC signal responsive to a control signal 162 from assist motor controller 160. The output DC signal (or some other sense signal) from DC/DC converter 154 may be transmitted to capacitor 156 for storing the electrical energy. In some examples, the DC converter deliver a signal that is stored as electrical energy on the capacitor. The stored voltage is determined by the charge stored on the capacitor and the capacity. The capacity of capacitor 156 may be determined depending on the required power for driving vehicle 100. In some examples, the capacity of capacitor 156 may be in the range 0.5 F-10 F, for example 2 F-5 F. In some examples, the maximum stored voltage may be in the range 50V-500V, for example 100V-300V. An example capacitor may have a capacity of 3.5 F and a maximum stored voltage of 200V.

In some embodiments, capacitor 156 may be configured to provide the stored electrical energy in the form of DC signal to inverter 158, where the inverter 158 may be configured to generate an AC signal from the DC signal. The voltage level and frequency of the AC signal generated from inverter 158 may be controlled based on a control signal 166 from assist motor controller 160. The AC signal from inverter 158 may be provided to assist motor 170 for driving the rotation of drive shaft 192.

Although FIG. 3 illustrates that inverter 158 provides the AC signal to assist motor 170 (e.g., AC motor), a DC/DC converter may be arranged in place of inverter 158 such that a DC motor may be utilized as the assist motor 170. In this case, the DC/DC converter may be configured to control the voltage level of the DC signal from capacitor 156 based on the control signal 166 from assist motor controller 160.

In some examples, the assist motor controller 160 may be operable to control the rate of transfer of electrical energy from the electric generator 130 and/or the charge storage device 150 to the assist motor 170. For example, the assist motor controller 160 may be configured to receive one or more engine control inputs, such as one or more of an accelerator (or throttle) signal, a vehicle speed signal, an engine speed signal, a brake signal, and the like. The assist motor controller 160 may be operable to allow transfer of electrical energy from the electric generator 130 and/or the charge storage device 150 to the assist motor 170 when an accelerator signal is received. The assist motor controller 160 may be operable to prevent electrical energy from reaching the assist motor 170 in response to receipt of a brake signal. In some examples, electrical energy may be used to apply a slowing torque or other slowing action to the drive shaft 192 when a brake signal is received. In some examples, electrical power stored in the charge storage device 150 may be used to power electrical accessories such as lights and/or vehicle electronics.

In some examples, the assist motor controller 160 may be configured to selectively supply power to the assist motor 170 in emergency situations, such as when an out of fuel signal is asserted or an engine malfunction signal is asserted, which may be utilized to assist a vehicle to reach a safe location. In some examples, when the engine stops the driveshaft may continue to rotate, for example due to momentum or continued movement of the vehicle. When the driveshaft rotates, electrical energy will continue to be generated due to the slippage in the torque converter; where the electrical energy may be used for emergency power or, for example, low speed vehicular motion. In some examples, such stopping of the engine may be used to increase fuel economy, and electrical energy generated from the slowing of the vehicle using torque converter slippage.

In some examples, the assist motor controller 160 may further be operable to control charge delivery to the charge storage device 150. In some example, the assist motor controller 160 may be configured to prevent overcharge of the charge storage device 150. In other examples, the assist motor controller 160 may be configured to limit the maximum charge flow (e.g., current limiting), adaptively control the rate of charge delivery to the charge storage device, regulate the maximum voltage of the charge storage device, and the like.

In some embodiments, assist motor controller 160 may be configured to control a rate of transfer of the electrical energy from charge storage device 150 or electric generator 130 to assist motor 170. Assist motor controller 160 may be operable to control the rate of transfer of the electrical energy based on at least one of various parameters including a voltage level 164 applied across charge storage device 150 (e.g., one or more capacitors 156), an electrical charge stored in charge storage device 150, a rotational speed of drive shaft 192, a speed and/or a torque of engine 110, a speed of wheels 190, and an accelerator input. Further, assist motor controller 160 may be configured to generate a fuel injection control signal, which may be fed to engine 110 to control the amount of fuel injected in engine 110.

Figure 4:
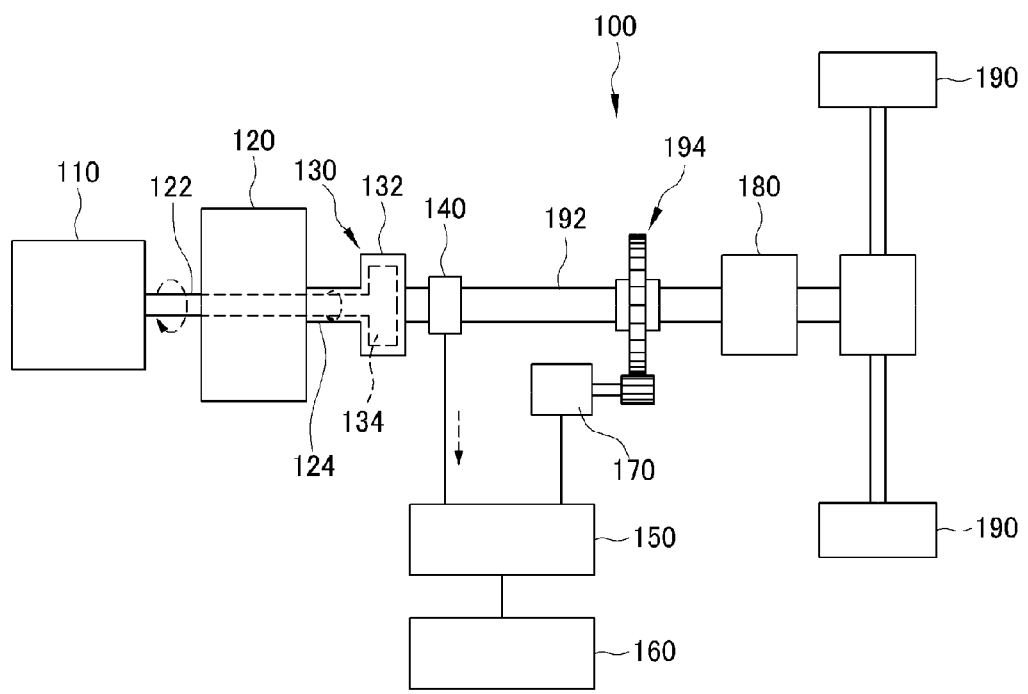
FIG. 4 schematically shows a block diagram of an illustrative example vehicle where drive wheels are stopped and an internal combustion engine is operating.

FIG. 4 schematically shows a block diagram of an illustrative example vehicle where wheels are stopped and an internal combustion engine is operating, arranged in accordance with at least some embodiments described herein. As depicted, when engine 110 begins to turn while drive shaft 192 (or wheels 190) is stopped, rotor 134 of electric generator 130 may also begin to rotate in conjunction with the rotation of engine 110 (as depicted using circular dashed arrows). However, as the rotational torque of engine 110 is not sufficient to cause fluid coupling in torque converter 120, the drive shaft may not rotate and the rotational torque of engine 110 may be lost in torque converter 120 without being transferred to stator 132 of electric generator 130. Thus, rotor 134 may rotate relative to stator 132 of electric generator 130, such that electric generator 130 may generate electrical energy that is coupled to charge storage device 150.

Electrical energy may be generated as the engine 110 operates and the vehicle remains stationary, using energy that would otherwise be dissipated by the torque converted. The electrical energy may be stored in a charge storage device 150, and used at other times when advantageous. For example, stored energy may be used to assist the acceleration of the vehicle. Energy waste may be reduced, and better performance may be obtained without additional fuel consumption, or alternatively fuel consumption may be reduced while similar performance may be obtained. For example, an engine management system may be configured to reduce power produced by the engine 110 when the assist motor 170 is being used to help acceleration, in order to reduce fuel consumption.

Figure 5:
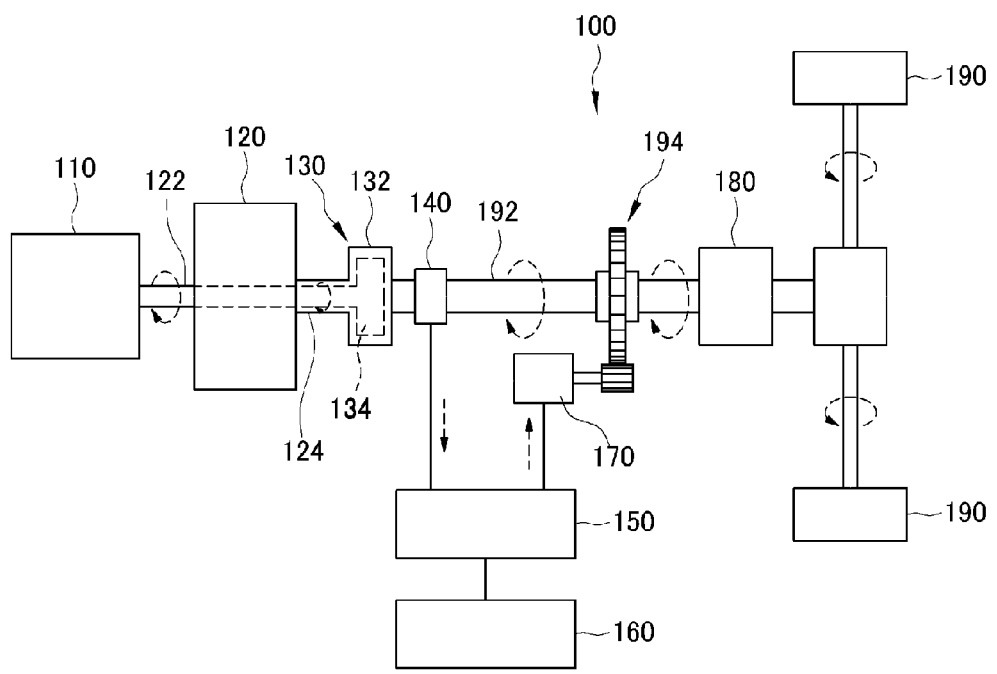
FIG. 5 schematically shows a block diagram of an illustrative example vehicle where the drive wheels are beginning to rotate.

FIG. 5 schematically shows a block diagram of an illustrative example vehicle where the wheels are beginning to rotate, arranged in accordance with at least some embodiments described herein. As depicted, as the rotational speed of engine 110 increases, the rotational speed of rotor 134 of electric generator 130 may also increase while the fluid coupling in torque converter 120 may cause stator 132 of electric generator 130 to rotate at a speed lower than the rotational speed of rotor 134. Accordingly, electric generator 130 may generate electrical energy due to the difference between the rotational speeds of rotor 134 and stator 132 of electric generator 130.

In general, the gear ratio of torque converter 120 becomes significant when wheels 190 of vehicle 100 begin to move, which results in an energy loss at torque converter 120. However, as described above, electric generator 130 may generate electrical energy due to the difference between the rotational speeds of rotor 134 and stator 132 of electric generator 130. Also, electric generator 130 may function as a torque converter while charge storage device 150 is being charged with the electrical energy. In this manner, the energy loss at torque converter 120 can be compensated by electric generator 130. Further, the electrical energy stored in charge storage device 150 may be used for driving assist motor 170 and thus it may be possible to improve the fuel consumption rate of engine 110.

As a vehicle accelerates, the rotational speed of the output shaft 124 of the torque converter 120 may be less than the rotational speed of the input shaft 122. This rotational speed difference may be used to generate electrical energy as the vehicle accelerates. Similarly, electrical energy may be generated as the vehicle slows, when the rotational speed of the input shaft becomes greater than that of the output shaft.

In some examples, electrical energy stored in the charge storage device 150 may be used to apply an accelerating torque to the drive shaft 192 as the vehicle accelerates, for example using an assist motor 170. Hence, the vehicle acceleration may be increased advantageously without using extra fuel, and/or fuel economy improved. Electrical energy generated by slippage in the torque converter 120 may also be directed to the assist motor 170 during acceleration, with or without prior storage in the charge storage device 150.

Figure 6:
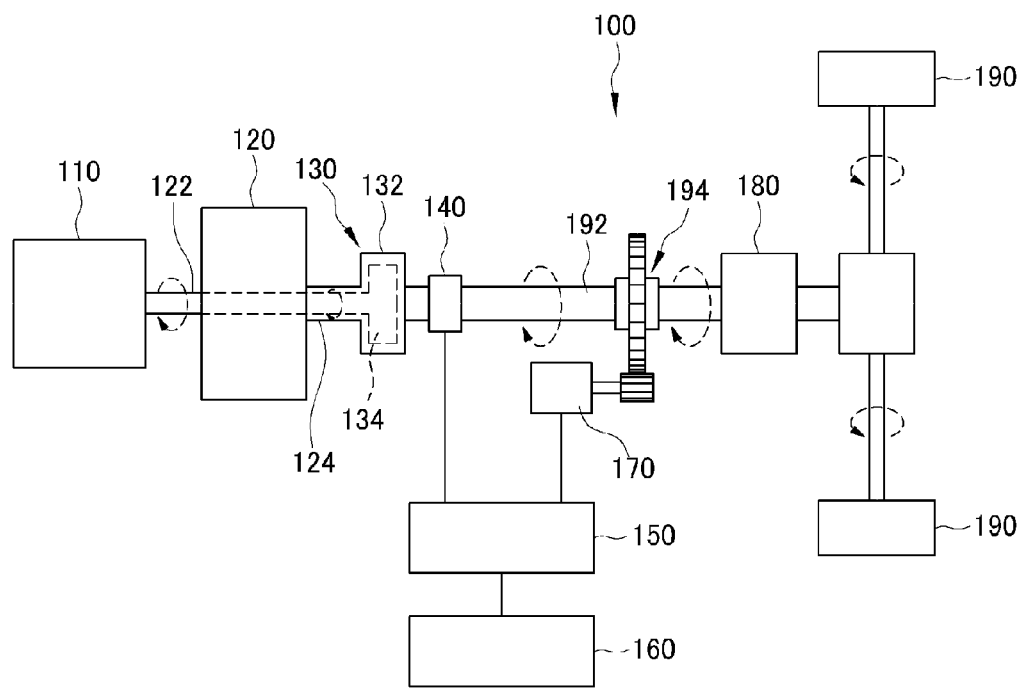
FIG. 6 schematically shows a block diagram of an illustrative example vehicle where the drive wheels are rotating at a constant speed and a torque converter is locked up.

FIG. 6 schematically shows a block diagram of an illustrative example vehicle where the wheels are rotating at a substantially constant speed and a torque converter is locked up, arranged in accordance with at least some embodiments described herein. As depicted, when engine 110 is turning at a substantially constant speed and torque converter 120 is locked up, the difference between the rotation rates of input and output shafts 122 and 124 may be small. Thus, the amount of electrical energy provided from electric generator 130 to charge storage device 150 may be reduced significantly to be substantially zero, which causes assist motor 170 to substantially stop.

Also, because assist motor 170 can be coupled to drive shaft 192 through one-way clutch 170, assist motor 170 may rotate idle without being engaged with drive shaft 192 when the rotation rate of drive shaft 192 becomes greater than that of assist motor 170. Accordingly, the rotation of assist motor 170 may not cause any load for engine 110 while engine 110 is rotating at a substantially constant speed. Further, assist motor controller 160 may be further configured to control charge storage device 150 to stop providing the electrical energy to assist motor 170 so that the electrical energy from electric generator 130 can be stored in charge storage device 150 when it is not useful to direct the electrical energy to the assist motor.

Further, when vehicle 110 decelerates, the rotational speed of engine 110 decreases while the rotational rate of drive shaft 192 may not decrease significantly. Thus, the rotational speed of rotor 134 of electric generator 130 may be lower than that of stator 132 of electric generator 130. Accordingly, electric generator 130 may generate electrical energy due to the difference between the rotational speeds of rotor 134 and stator 132 of electric generator 130. Thus generated electrical energy may be stored, and later used to drive the assist motor 170.

According to the above embodiments, since rotor 134 and stator 132 of electric generator 130 can be mechanically coupled to the input shaft 122 and the output shaft 124 of torque converter 120, electric generator 130 may work as a torque converter while generating electrical energy due to the difference between the rotation rates of input shaft 122 and output shaft 124 of torque converter 120. Thus, energy loss at torque converter 120 can be converted to electrical energy used to drive assist motor 170.

Further, according to the above embodiments, one or more capacitors can be configured as a charge storage device 150 and can be manufactured at a lower cost compared to a secondary battery such as a lithium ion battery used in conventional hybrid vehicles. Also, electric generator 130 and assist motor 170 can be incorporated into vehicle 100 at a relatively low cost.

Figure 7:
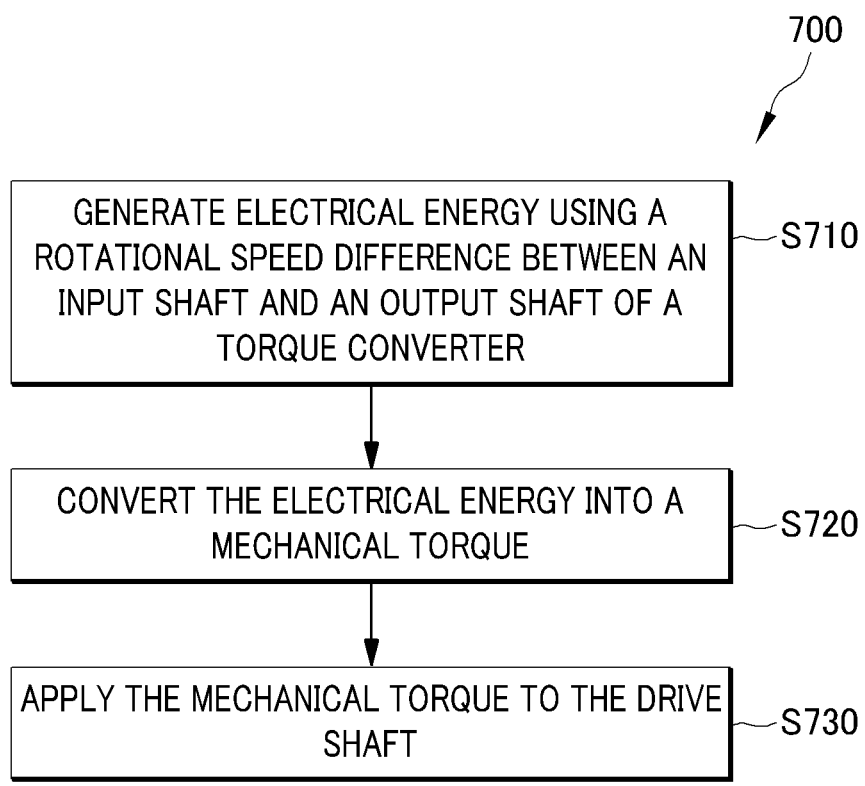
FIG. 7 illustrates an example flow diagram of a method adapted to harvest energy for a vehicle having a torque converter and an engine.

FIG. 7 illustrates an example flow diagram of a method adapted to harvest energy for a vehicle having a torque converter and an engine, arranged in accordance with at least some embodiments described herein. An example method 700 in FIG. 7 may be implemented using, for example, a computing device including a processor adapted to harvest energy for a vehicle having a torque converter and an engine.

Method 700 may include one or more operations, actions, or functions as illustrated by one or more of blocks S710, S720, and/or S730. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

Method 700 may begin at block S710, "GENERATE ELECTRICAL ENERGY USING A ROTATIONAL SPEED DIFFERENCE BETWEEN AN INPUT SHAFT AND AN OUTPUT SHAFT OF A TORQUE CONVERTER." At block S710, electrical energy may be generated using a rotational speed difference between an input shaft and an output shaft of a torque converter. Examples of block S710 are illustrated in FIGS. 1 to 6. As illustrated, input shaft 122 of torque converter 120 may be mechanically coupled to an engine 110, and output shaft 124 of torque converter 120 may be mechanically coupled to a drive shaft 192. Further, first portion 134 of electric generator 130 may be mechanically coupled to input shaft 122 of torque converter 120, and second portion 132 of electric generator 130 may be mechanically coupled to output shaft 124 of torque converter 120. With this configuration, electric generator 130 may be operable to generate electrical energy when first portion 134 rotates relative to second portion 132.

As described above, because torque converter 120 has a fluid coupling configuration, first portion 134 of electric generator 130 rotates relative to second portion 132 of electric generator 130 when there is slippage in the fluid coupling configuration. In some embodiments, electric generator 130 may be operable to generate electrical energy in different manners depending on the rotation rates of engine 110 and drive shaft 192. As depicted in FIG. 4, when drive shaft 192 (or wheels 190) is stopped while engine 110 begins to turn, rotor 134 of electric generator 130 may also begin to rotate in conjunction with the rotation of engine 110. However, as the rotational torque of engine 110 may not be sufficient to cause fluid coupling in torque converter 120, the rotational torque of engine 110 may be lost in torque converter 120 without being transferred to stator 132 of electric generator 130. Instead, rotor 134 may rotate relative to stator 132 of electric generator 130, such that electric generator 130 may generate and couple electrical energy to charge storage device 150.

As depicted in FIG. 5, as the rotational speed of engine 110 increases, the rotational speed of rotor 134 of electric generator 130 may also increase while the fluid coupling in torque converter 120 may cause stator 132 of electric generator 130 to rotate at a speed lower than the rotational speed of rotor 134. Accordingly, electric generator 130 may generate electrical energy due to the difference between the rotational speeds of rotor 134 and stator 132 of electric generator 130.

As illustrated in FIG. 6, when vehicle 110 decelerates, the rotational speed of engine 110 decreases while the rotation rate of drive shaft 192 may not decrease significantly. Thus, the rotational speed of rotor 134 of electric generator 130 may be lower than that of stator 132 of electric generator 130. Accordingly, electric generator 130 may generate electrical energy due to the difference between the rotational speeds of rotor 134 and stator 132 of electric generator 130. Thus generated electrical energy may be used for driving assist motor 170 at a later time. In block S710, electrical energy may be generated whenever there is a rotational speed difference between the input and output shafts of a torque converter, for example by using the rotational speed difference to generate electrical energy using an electric generator.

Block S710 may be followed by block S720, "CONVERT THE ELECTRICAL ENERGY INTO A MECHANICAL TORQUE." At block S720, the electrical energy may be converted into a mechanical torque. Examples of block S720 are illustrated in FIGS. 1 to 6. As illustrated, charge storage device 150 may be configured to provide the stored electrical energy to assist motor 170. The electrical energy generated using a rotational speed difference between an input shaft and output shaft of a torque converter may be converted to a mechanical torque using one or more electric motors.

Block S720 may be followed by block S730, "APPLY THE MECHANICAL TORQUE TO THE DRIVE SHAFT." At block S730, the mechanical torque may be applied to the drive shaft. Examples of block S730 are illustrated in FIGS. 1 to 6. As illustrated, assist motor 170 may be coupled to drive shaft 192 through a one-way clutch 194 coupled to drive shaft 192. Also, drive shaft 192 may be coupled to drive wheels 190 via a transmission 180. In this configuration, output shaft 124 of torque converter 120 can be coupled to drive shaft 192 via transmission 180.

Mechanical torque may be applied to the drive shaft using any appropriate method, such as a one-way clutch, fluid coupling, gearing, frictional contact, or the like. The mechanical torque may be used to assist acceleration of the vehicle, for example by adding to the torque contributed by the engine. In some examples, a decelerating torque may be applied, for example after a braking input to the vehicle.

In some examples, an energy harvesting system for a vehicle having an engine and a drive shaft comprises a torque converter mechanically coupled to the engine and to the drive shaft and configured to convey rotational torque from the engine to the drive shaft, an electric generator configured to generate electrical energy when there is slippage in the torque converter, a charge storage device electrically coupled to the electric generator and operable to store at least a portion of the electrical energy as stored electrical energy, and an assist motor mechanically coupled to the drive shaft and operable to receive electrical energy generated by the electric generator.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
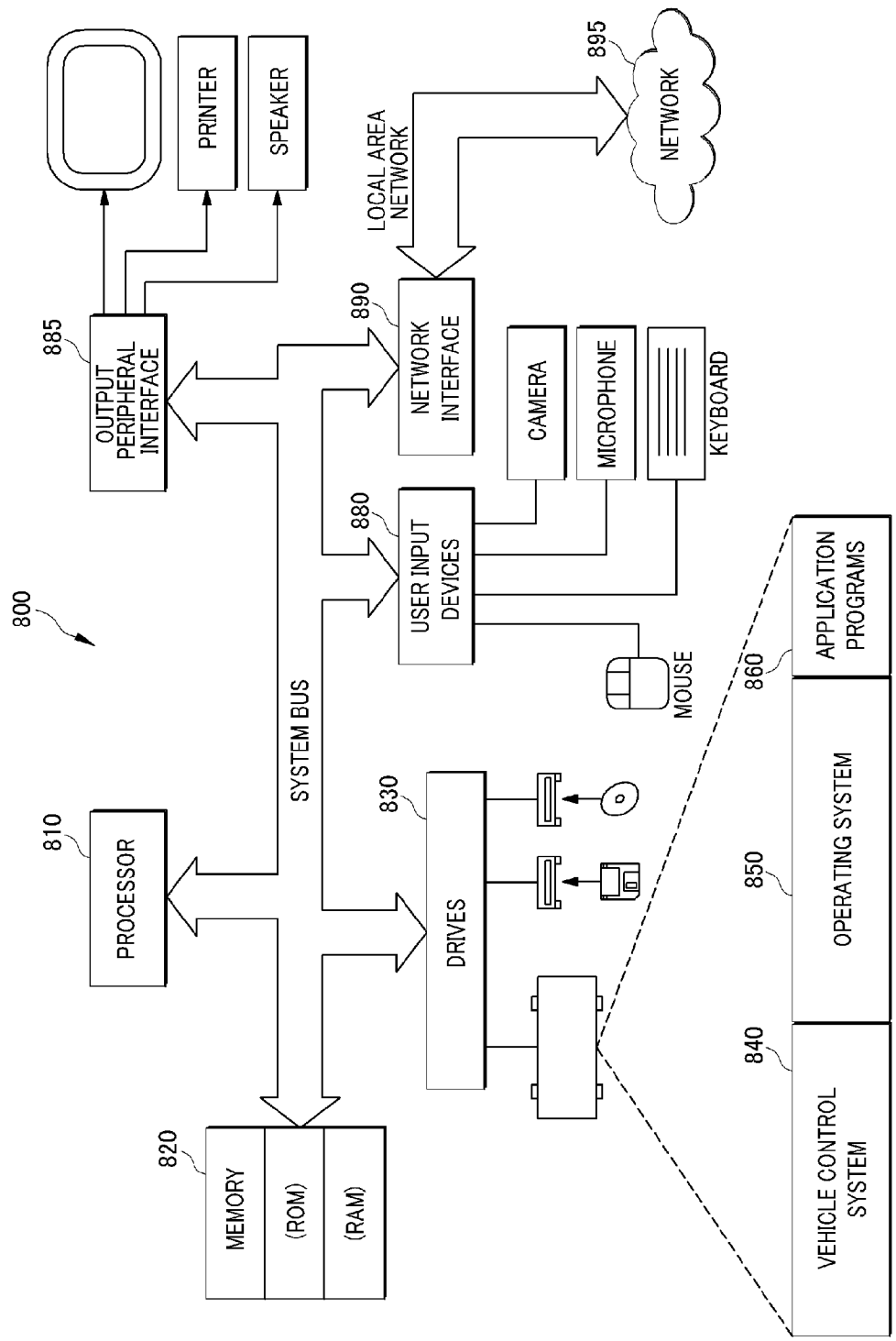
FIG. 8 shows a schematic block diagram illustrating an example computing system that can be configured to perform methods for harvesting energy for a vehicle having a torque converter and an engine.

FIG. 8 shows a schematic block diagram illustrating an example computing system that can be configured to perform methods for harvesting energy for a vehicle having a torque converter and an engine, arranged in accordance with at least some embodiments described herein.

As depicted in FIG. 8, a computer 800 may include a processor 810, a memory 820 and one or more drives 830. Computer 800 may be implemented as a conventional computer system, an embedded control computer, a laptop computer, or a server computer, a smartphone, a tablet computer, a set-top box, a kiosk, a vehicular information system, a mobile telephone, a customized machine, or other hardware platform.

Drives 830 and their associated computer storage media may provide storage of computer readable instructions, data structures, program modules and other data for computer 800. Drives 830 may include a vehicle control system 840, an operating system (OS) 850, and application programs 860. Vehicle control system 840 may be adapted to control an energy harvesting system for a vehicle having an engine and a drive shaft in such a manner as described above with respect to FIGS. 1 to 7.

Computer 800 may further include user input devices 880 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 810 through a user input interface that is coupled to a system bus, but may be coupled by other interface and bus structures, such as a parallel port, game port or a universal serial bus (USB). Computers such as computer 800 may also include other peripheral output devices such as display devices, which may be coupled through an output peripheral interface 885 or the like.

Computer 800 may operate in a networked environment using logical connections to one or more computers, such as a remote computer coupled to a network interface 890. The remote computer may be a personal computer, a server, a router, a network PC, a peer device or other common network node, and can include many or all of the elements described above relative to computer 800.

Networking environments are commonplace in offices, enterprise-wide area networks (WAN), local area networks (LAN), intranets, and the Internet. When used in a LAN or WLAN networking environment, computer 800 may be coupled to the LAN through network interface 890 or an adapter. When used in a WAN networking environment, computer 800 typically includes a modem or other means for establishing communications over the WAN, such as the Internet or a network 895. The WAN may include the Internet, the illustrated network 895, various other networks, or any combination thereof. It will be appreciated that other mechanisms of establishing a communications link, ring, mesh, bus, cloud, or network between the computers may be used.

In some embodiments, computer 800 may be coupled to a networking environment. Computer 800 may include one or more instances of a physical computer-readable storage medium or media associated with drives 830 or other storage devices. The system bus may enable processor 810 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as storage drives 830 or otherwise. Hard drive implementations may be characterized as solid state, or may include rotating media storing magnetically encoded information.

Processor 810 may be constructed from any number of transistors or other circuit elements, which may individually or collectively assume any number of states. More specifically, processor 810 may operate as a state machine or finite-state machine. Such a machine may be transformed to a second machine, or specific machine, by loading executable instructions. These computer-executable instructions may transform processor 810 by specifying how processor 810 transitions between states, thereby transforming the transistors or other circuit elements constituting processor 810 from a first machine to a second machine. The states of either machine may also be transformed by receiving input from user input devices 880, network interface 890, other peripherals, other interfaces, or one or more users or other actors. Either machine may also transform states, or various physical characteristics of various output devices such as printers, speakers, video displays, or otherwise.

Figure 9:
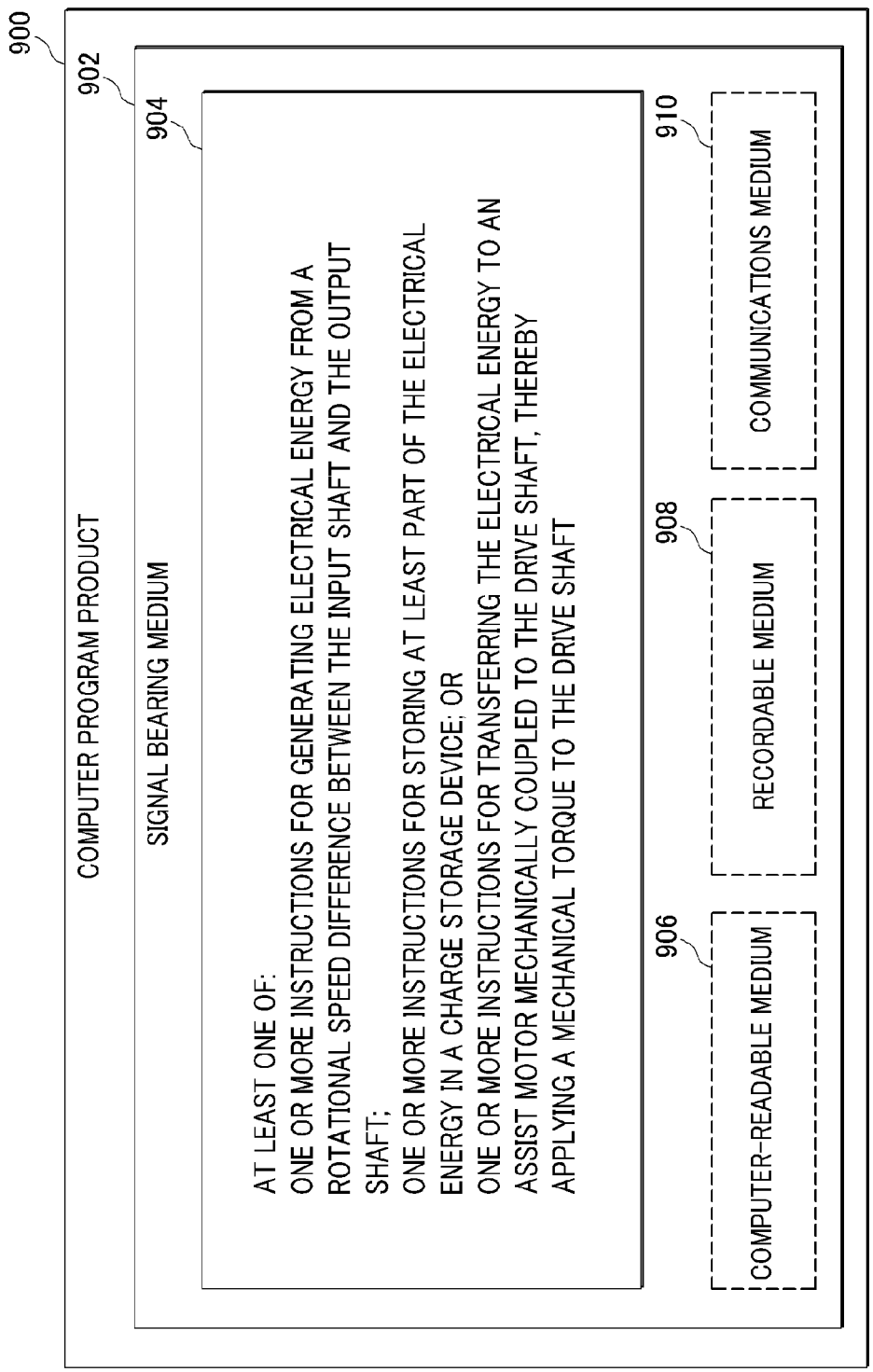
FIG. 9 illustrates computer program products that can be utilized to harvest energy for a vehicle having a torque converter and an engine, all arranged in accordance with at least some embodiments described herein.

FIG. 9 illustrates computer program products 900 that can be utilized to harvest energy for a vehicle having a torque converter and an engine, arranged in accordance with at least some embodiments described herein. In some examples, the vehicle may have an engine, a torque converter, and a drive shaft, the torque converter having an input shaft and an output shaft. Program product 900 may include a signal bearing medium 902. Signal bearing medium 902 may include one or more instructions 904 that, when executed by, for example, a processor, may provide the functionality described above with respect to FIGS. 1 to 7. By way of example, instructions 904 may include at least one of: one or more instructions for generating electrical energy from a rotational speed difference between the input shaft and the output shaft; one or more instructions for storing at least part of the electrical energy in a charge storage device; or one or more instructions for transferring the electrical energy to an assist motor mechanically coupled to the drive shaft, thereby applying a mechanical torque to the drive shaft. Thus, for example, referring to FIGS. 1 and 6, a vehicle 100 may undertake one or more of the blocks shown in FIG. 7 in response to instructions 904.

In some implementations, signal bearing medium 902 may encompass a computer-readable medium 906, such as, but not limited to, a hard disk drive, a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of MMORPG control system 100 or 600 by an RF signal bearing medium 902, where the signal bearing medium 902 is conveyed by a wireless communications medium 910 (e.g., a wireless communications medium conforming with the IEEE 802.11 standard).

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An energy harvesting system for a vehicle having an engine and a drive shaft, the system comprising:
   a torque converter having an input shaft and an output shaft, wherein the input shaft is mechanically coupled to the engine, and the output shaft is mechanically coupled to the drive shaft;
   an electric generator having a first portion and a second portion, wherein the first portion is mechanically coupled to the input shaft of the torque converter, and the second portion is mechanically coupled to the output shaft of the torque converter, and wherein the electric generator is operable to generate electrical energy when the first portion of the electric generator rotates relative to the second portion of the electric generator;

a charge storage device, wherein the charge storage device is electrically coupled to the electric generator and operable to store at least a portion of the electrical energy as stored electrical energy; and an assist motor mechanically coupled to the drive shaft and operable to receive the electrical energy generated by the electric generator.

2. The system of claim 1, wherein the first portion of the electric generator is a rotor and the second portion of the electric generator is a stator, or wherein the first portion of the electric generator is a stator and the second portion of the electric generator is a rotor.

3. The system of claim 1, wherein the torque converter includes a fluid coupler, and wherein the first portion of the electric generator rotates relative to the second portion of the electric generator when there is slippage in the fluid coupler.

4. The system of claim 1, wherein the engine is an internal combustion engine.

5. The system of claim 1, wherein the engine is selected from a group of engines consisting of a gasoline engine, a diesel engine, a gas turbine engine, a rotary engine, a Wankel rotary engine, a barrel engine, a gasoline-electric hybrid engine, and a diesel-electric hybrid engine.

6. The system of claim 1, wherein the vehicle has one or more wheels, and wherein the drive shaft is coupled to at least one of the one or more wheels.

7. The system of claim 1, wherein the vehicle is selected from a group of vehicles consisting of automobiles, trucks, motorcycles, and trains.

8. The system of claim 1, further comprising a rectifier, wherein the charge storage device is electrically coupled to the electric generator through the rectifier.

9. The system of claim 1, further comprising a slip ring or a commutator, wherein the charge storage device is configured to receive the electrical energy from the electric generator through the slip ring or the commutator.

10. The system of claim 1, further comprising an assist motor controller, wherein the assist motor controller is operable to control a rate of transfer of the electrical energy from the electric generator or from the charge storage device to the assist motor.

11. The system of claim 10, wherein the assist motor controller is operable to control the rate of transfer of the electrical energy based on at least one parameter selected from a group of parameters consisting of:

a voltage across the charge storage device, an electrical charge stored on the charge storage device, a rotational speed of the drive shaft, an engine speed, an engine torque, a wheel speed, and an accelerator input.

12. The system of claim 10, wherein the assist motor controller is configured to receive an accelerator signal and a charge storage signal correlated with a stored charge on the charge storage device.

13. The system of claim 1, wherein the assist motor is coupled to the drive shaft via a one-way clutch.

14. The system of claim 1, wherein the electric generator is an AC generator or a DC generator.

15. The system of claim 1, wherein the output shaft of the torque converter is coupled to the drive shaft via a transmission.

16. The system of claim 1, wherein the output shaft of the torque converter, and the drive Shaft are the same shaft.

17. A method to harvest energy for a vehicle having a torque converter, and an engine, wherein the torque converter has an input shaft driven by the engine, and an output shaft, the method comprising:

coupling a first portion of an electrical generator to the input shaft of the torque converter and coupling a second portion of the electrical generator to the output shaft of the torque converter;

generating electrical energy by a relative rotation between the first portion of the electrical generator and the second portion of the electrical generator in response to a rotational speed difference between the input shaft of the torque converter and the output shaft of the torque converter;

converting the electrical energy into a mechanical torque; and applying the mechanical torque to a drive shaft that is mechanically coupled to the output shaft.

18. The method of claim 17, wherein the first portion of the electrical generator is a stator and the second portion of the electrical generator is a rotor, or wherein the first portion of the electrical generator is a rotor and the second portion of the electrical generator is a stator.

19. The method of claim 17, wherein convening the electrical energy, into the mechanical torque comprises transmitting the electrical energy to an assist motor that is mechanically coupled to the drive shaft, and wherein the mechanical torque is applied to the drive shaft using the assist motor.

20. The method of claim 17, further comprising storing at least a portion of the electrical energy as a stored electrical charge.

21. The method of claim 20, wherein storing the at least the portion of the electrical energy comprises storing the at least the portion of the electrical energy in a charge storage device, and wherein the charge storage device includes a capacitor, pseudocapacitor, Ultracapacitor, or a battery.

22. The method of claim 17, wherein the torque converter includes a fluid coupler, wherein a slippage in the fluid coupler creates the rotational speed difference between the input shaft of the torque converter and the output shaft of the torque converter, and wherein the rotational speed difference is used to generate the electrical energy.

23. A non-transitory computer-readable storage medium which stores a program to control a processor operable to harvest energy for a vehicle, wherein the vehicle has an engine, a torque converter, and a drive shaft, wherein the torque converter has an input shaft and an output shaft, and wherein the program comprises one or more instructions to control the processor to perform or control performance of operations comprising:

couple a first portion of an electrical generator to the input shaft of the torque converter and couple a second portion of the electrical generator to the output shaft of the torque converter;

generate electrical energy, via a relative rotation between the first portion of the electrical generator and the second portion of the electrical generator, in response to a rotational speed difference between the input shaft of the torque converter and the output shaft of the torque converter;

store at least a portion of the electrical energy in a charge storage device; and transfer the electrical energy to an assist motor that is mechanically coupled to the drive shaft, so as to apply a mechanical torque to the drive shaft.

24. The non-transitory computer-readable storage medium of claim 23, wherein the mechanical torque is applied to the drive shaft during an acceleration of the vehicle.

25. The non-transitory computer-readable storage medium of claim 23, wherein substantially all of the electrical energy is stored in the charge storage device, and wherein the mechanical torque is not applied to the drive shaft while the vehicle is stopped.

26. The non-transitory computer-readable storage medium of claim 23, wherein the stored electrical energy is transferred to the assist motor during an acceleration of the vehicle, so as to apply the mechanical torque to the drive shaft, and wherein the mechanical torque applied using the assist motor adds to an engine torque applied to the drive shaft by the engine.

* * * * *